(12) United States Patent
Boettcher et al.

(10) Patent No.: US 11,133,817 B1
(45) Date of Patent: Sep. 28, 2021

(54) MICROARCHITECTURAL FEATURES FOR MITIGATION OF DIFFERENTIAL POWER ANALYSIS AND ELECTROMAGNETIC ANALYSIS

(71) Applicant: Arm Limited, Cambridge (GB)

(72) Inventors: Matthias Lothar Boettcher, Cambridge (GB); Hugo John Martin Vincent, Cambridge (GB); Brendan James Moran, Histon (GB)

(73) Assignee: ARM LIMITED, Cambridge (GB)

( * ) Notice: Subject to any disclaimer, the term of this patent is extended or adjusted under 35 U.S.C. 154(b) by 0 days.

(21) Appl. No.: 16/929,930

(22) Filed: Jul. 15, 2020

(51) Int. Cl.
| | |
|---|---|
| *H03M 1/12* | (2006.01) |
| *H03M 1/46* | (2006.01) |
| *H03M 3/00* | (2006.01) |
| *H03M 1/14* | (2006.01) |

(52) U.S. Cl.
CPC ........... *H03M 1/468* (2013.01); *H03M 1/145* (2013.01); *H03M 1/462* (2013.01); *H03M 3/30* (2013.01)

(58) Field of Classification Search
CPC .............................. H03M 1/468; H03M 1/145
USPC ................................ 341/143, 118, 120, 163
See application file for complete search history.

(56) References Cited

U.S. PATENT DOCUMENTS

| | | | |
|---|---|---|---|
| 6,839,013 B1 * | 1/2005 | Cummins | G06F 11/3656 341/120 |
| 7,209,069 B2 * | 4/2007 | Felder | H03M 1/462 341/144 |
| 7,898,453 B2 * | 3/2011 | Mathe | H03M 1/462 341/172 |

* cited by examiner

*Primary Examiner* — Peguy Jean Pierre
(74) *Attorney, Agent, or Firm* — Talem IP Law, LLP (57) ABSTRACT

A processing system with a microarchitectural feature for mitigation of differential power analysis and electromagnetic analysis attacks can include a memory, a processor, and a mitigation response unit. The processor can include an instruction predictor that comprises a storage device for storing metadata associated with corresponding instruction blocks. The mitigation response unit is coupled to the instruction predictor to write and read the metadata associated with the corresponding instruction blocks. The mitigation response unit is configured to determine a mitigation technique for an instruction block based on an electromagnetic or power signature corresponding to execution of the instruction block and metadata associated with the instruction block.

20 Claims, 7 Drawing Sheets

MICROARCHITECTURAL FEATURES FOR MITIGATION OF DIFFERENTIAL POWER ANALYSIS AND ELECTROMAGNETIC ANALYSIS

BACKGROUND

Side channel attacks (SCAs) refer to a set of attack techniques that may be used to compromise the security of a smart card or other computing device. SCAs generally include attacks based on information gained from the physical implementation of a cryptosystem, including timing information, power consumption, electromagnetic leaks, and sound.

By observing electromagnetic radiation emitted when bits are transferred to and from memory (or between other components), values of the bits being conveyed across lines on the chip may be identified. Similarly, an adversary may use power analysis and correlate power usage with the sensitive data. For example, differential power analysis, which is a statistical method for analyzing power consumption, may be used to identify data-dependent correlations. For differential power analysis, multiple traces of two sets of data are obtained, and the difference of the average of these traces is computed. If the difference is close to zero, then the two sets are considered not correlated. If the two sets are correlated, then the difference will be a non-zero number and given enough traces, even tiny correlations can be seen, regardless of how much noise is in the system.

BRIEF SUMMARY

Microarchitectural features are provided for the mitigation of differential power analysis (DPA) and electromagnetic (EM) analysis attacks. A microarchitectural feature is described that can annotate a branch predictor state with information that can later be used to tune DPA and EM mitigation mechanisms. This feature uses predictive modelling to tune or diffuse a circuit's power and/or electromagnetic (EM) signature.

A processing system with a microarchitectural feature for mitigation of differential power analysis and electromagnetic analysis can include at least a memory, a processor, and a mitigation response unit. The processor can include an instruction predictor that comprises a storage device for storing metadata associated with corresponding instruction blocks. The mitigation response unit is coupled to the instruction predictor to write and read the metadata associated with the corresponding instruction blocks. The mitigation response unit is configured to determine a mitigation technique for an instruction block based on an electromagnetic or power signature corresponding to the execution of the instruction block and metadata associated with the instruction block.

A method for the mitigation of information leakage from differential power analysis and electromagnetic analysis can include predicting a next instruction block; reading at least one bit from metadata associated with the next instruction block; applying a mitigation technique according to the at least one bit read from the metadata; receiving a signature measurement obtained during execution of the next instruction block; determining whether the signature measurement exceeds a threshold value for the signature measurement; and writing at least one bit to the metadata associated with the next instruction block according to a result of the determining whether the signature measurement exceeds the threshold value for the signature measurement.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Microarchitectural features are provided for mitigation of differential power analysis (DPA) and electromagnetic (EM) analysis attacks. A microarchitectural feature is described that can annotate a branch predictor state with information that can later be used to tune DPA and EM attack mitigation mechanisms.

Figure 1:
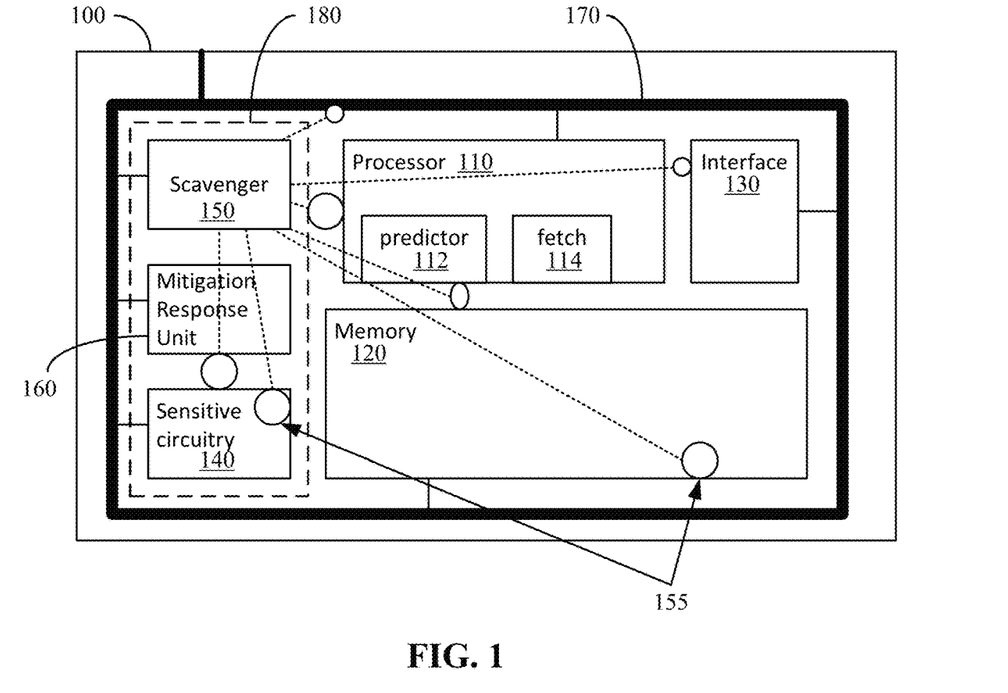
FIG. 1 shows a simplified view of a processing system with various blocks.

FIG. 1 shows a simplified view of a processing system with various blocks. Referring to FIG. 1, a chip 100 implementing a processing system can include a plurality of different circuit blocks and sub-blocks, including, but not limited to, a processor 110, memory 120, interface circuitry 130, a sensitive operations circuitry block 140 (e.g., a cryptographic block), a data scavenger 150 having a collection fabric coupled to elements of interest 155 on the chip 100, and a mitigation response unit 160. Although not shown, the chip 100 can also include analog circuitry and other blocks. The various blocks on the chip 100 can be coupled to a power rail 170, which is also subject to sensing by the data scavenger 150.

The processor 110 can include sub-blocks such as an instruction predictor 112 and an instruction fetch unit 114.

The memory 120 can store instructions that are executed by processor 110 and/or data.

The fabric of the data scavenger 150 is coupled to or includes sensors (e.g., comparators, current detectors or monitors, voltage detectors or monitors, etc.), counters, and storage to support collection of data including from data/address buses, the command flow, and other resources. In some cases, the data scavenger 101 can include sensors to detect electromagnetic emissions. Although the data scavenger 150 is shown in a designated part of the chip 100, the data scavenger (as well as other blocks) can have components distributed across the chip 100.

The scavenger 150 and mitigation response unit 160 may be in a secure area 180 of the chip 100 along with the sensitive operations circuitry block 140 that performs sensitive operations and/or stores sensitive data. In some cases, the entirety of the chip is part of a secure area (e.g., including the processor 110, memory 120, and interface 130). Of course, more or fewer components may be part of one or more secure areas on the chip 100.

According to certain implementations, a processing system with a microarchitectural feature for mitigation of differential power analysis and electromagnetic analysis attacks can include at least the memory 120, processor 110, and mitigation response unit 160.

Figure 2:
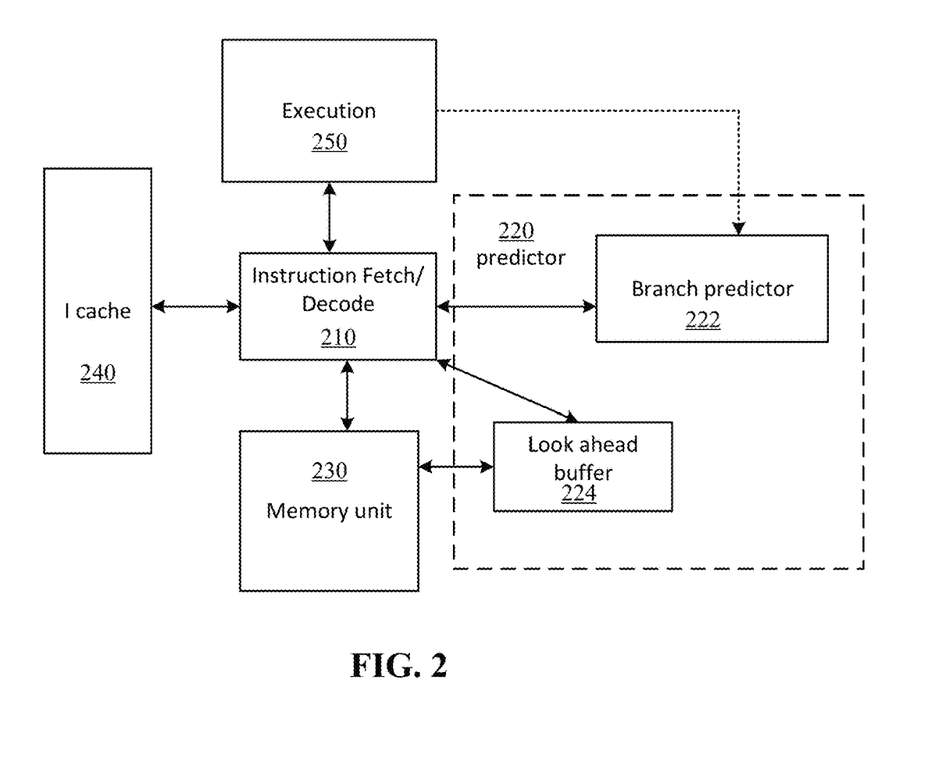
FIG. 2 illustrates a simplified microarchitecture of a processor.

FIG. 2 illustrates a simplified microarchitecture of a processor. Referring to FIG. 2, a microarchitecture of a processor, such as processor 110 with predictor 112 and fetch unit 114 of FIG. 1, can include an instruction fetch unit 210 (which can include or be coupled to an address decoder), an instruction predictor 220, various caches such as memory unit 230, and I cache 240, and an execution unit 250.

The fetch unit 210 can read instructions from memory (e.g., memory unit 230 or I cache 240) and, using the instruction predictor 220, can predict which addresses to fetch.

The instruction predictor 220 at least includes a storage device for storing metadata associated with corresponding instruction blocks. The instruction predictor 220 can be any circuitry that supports metadata being associated with individual basic blocks (or instructions). For example, the instruction predictor 220 can be implemented with a branch predictor 222 or a look ahead buffer 224 or both the branch predictor 222 and the look ahead buffer 224. In some implementations, additional bits (e.g., at least one set of mitigation metadata bits) are added to the structure supporting the storage of metadata. This can be accomplished by widening existing structures to hold the at least set of mitigation metadata bits.

A basic block describes all the instructions between two branches. The term branch includes all instructions used to modify the schedule of instructions to be executed. For instance, branch instructions, return instructions, or instruction directly updating the program counter. The latter may for example include load, mov, arithmetic and logic instructions. In one implementation, the granularity of a prediction and/or response is of a basic block and a response can be applied to that unit of instructions.

Examples of circuitry that can be used to implement instruction predictor 220 include but are not limited to, single-level branch predictors, two-level branch predictors, and hybrid and multiple component hybrid branch predictors. In addition, although a look ahead buffer is not generally classified as a predictor, because the look ahead buffer provides an advance indication of a block or single instruction, a look ahead buffer can be used as part of the instruction predictor 220. Indeed, other structures potentially suitable for the desired metadata storage used by the mitigation response unit described herein, may include branch target buffers and loop buffers. The latter are used to keep a small number of instructions inside the processor in decoded form. This accelerates the execution of loops with multiple iterations. A loop buffer may therefore be extended with metadata bits, indicating if and to what degree the instruction sequence it contains warrants tuning. In a similar fashion, metadata can be added to instruction caches (e.g., I-cache 240) and/or trace caches to guide a model used by a mitigation response unit on later occurrences of previously executed code sequences.

The memory unit 230 may be a set of registers that can store instructions and/or data in accordance with various implementations.

The I cache 240 refers to an instruction cache and is a cache that facilitates the execution of instructions by the execution unit 250.

The execution unit 250 performs/executes the operations and calculations as instructed by the instructions fetched by the fetch unit 210.

Figure 3:
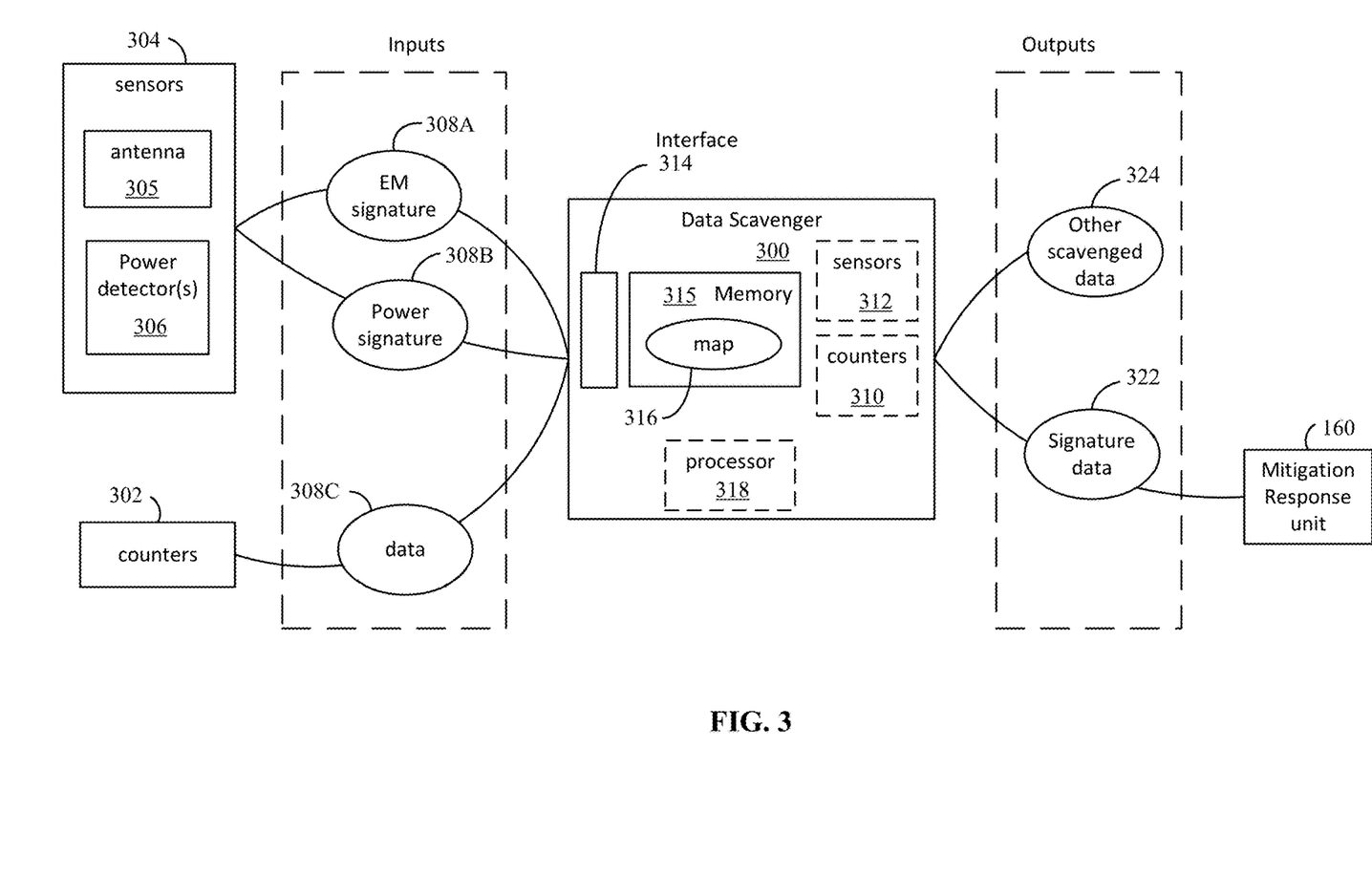
FIG. 3 illustrates a representational diagram of a data scavenger.

FIG. 3 illustrates a representational diagram of a data scavenger. As mentioned above with respect to data scavenger 150 of FIG. 1, a data scavenger 300 can scavenge/collect data from at least one element of interest from sources such as counters 302 and sensors 304. In a specific implementation, the data scavenger 300 includes or is coupled to sensors such as one or more antennas 305 for capturing an electromagnetic signature 308A and one or more power, current, or voltage monitors 306 for capturing a power signature 308B. An electromagnetic signature refers to the observable energy radiated by components (e.g., devices and lines in a chip) when operated. A power signature refers to the changes in the power consumption over time that can be indicative of operations of the devices (e.g., transistors) (and therefore data). Other data 308C can be collected from the counters (and other sensors).

Counters 302 can include performance counters such as for cache hit/miss, store buffer fill level, branch miss prediction, cache flush signal, current power state, and interrupts per second, as examples. Counters 302 can further include system counters such as for memory, networking, power management, and other components. Counters 302 can also include debug/software visible performance counters. The data scavenger 300 can further include its own dedicated counters 310.

Sensors 304 can include sensors for power supply voltage level (direct readout or threshold level indicators such as over/under power), current clock skew, on-chip temperature, physical stress level (e.g., bend or pressure) noise level. As mentioned above, sensors 304 include one or more antennas 305 for capturing an electromagnetic signature and/or one or more power, current, or voltage monitors 306 for capturing a power signature. In some cases, sensors 304 can include sensors detecting physical location and/or velocity of the chip (e.g., GPS, accelerometer, magnetometer, gyroscope). The data scavenger 300 can further include its own dedicated sensors 312.

The data scavenger 300 can include an optional interface 314 and a memory device 315 such as a register (e.g., a flip flop or latch), a read only memory (ROM), or a random access memory (RAM) such as MRAM (magnetoelectric RAM), that stores a memory map 316 indicating the resources to collect information from.

The interface 314 can include the circuitry supporting communications off-chip or to other parts of a system on a chip. The interface 314 may include switches or more complicated circuitry.

The memory map 316 can be considered a configuration signal. In some cases, this memory map 316 is used to turn on or gain access to certain resources. For example, the memory map 316 may be used to indicate which switches to select to turn on a resource. Of course, some resources may be turned on directly by the value (from the memory map 316) of the register/memory device. In some cases, the memory map 316 can be initiated by ROM code (e.g., the code executed by a booting core).

In some cases, the data scavenger 300 can further include a processor 318. The processor 318 may be dedicated to managing the memory map configurations. In some implementations that include the processor 318, the processor 318 can be in a secure part of the chip.

The data collected and output by the data scavenger 300 can include signature data 322 (e.g., EM signature 308A and/or power signature 308B) and other scavenged data 324. In some of the examples provided herein, a mitigation response unit 160 uses the signature data 322; however, implementations are not limited thereto.

Figure 4:
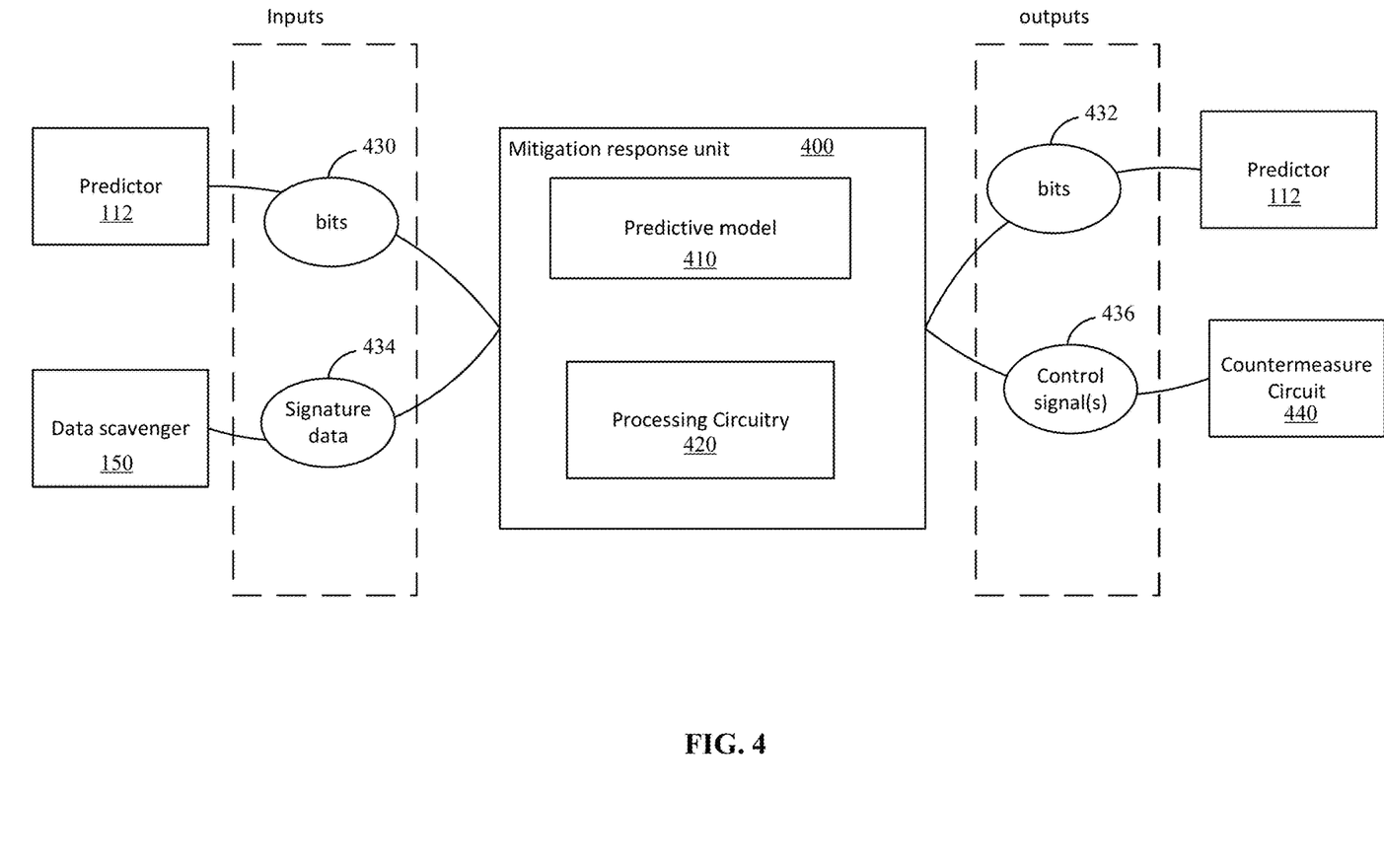
FIG. 4 illustrates a representational diagram of a mitigation response unit.

FIG. 4 illustrates a representational diagram of a mitigation response unit. Referring to FIG. 4, a mitigation response unit 400 can include a predictive model 410 (e.g., stored in memory) and processing circuitry 420. Processing circuitry 420 can include various circuits and storage for carrying out processes such as described herein, including process 550 described with respect to FIG. 5B.

The mitigation response unit 400 receives (or otherwise obtains) bits 430 from metadata associated with an instruction identified by instruction predictor 112 and outputs one or more bits 432 to the predictor 112. That is, the mitigation response unit 400 can be coupled to the instruction predictor 112 to write and read the metadata associated with corresponding instruction blocks.

The mitigation response unit 400 can also receive signature data 434 (e.g., EM/power signature) from a data scavenger 150. Although not shown, a higher level system, such as an operating system may provide input to the mitigation response unit to support the predictive model 410 and/or provide information on expected signatures of instructions.

Figure 6A:
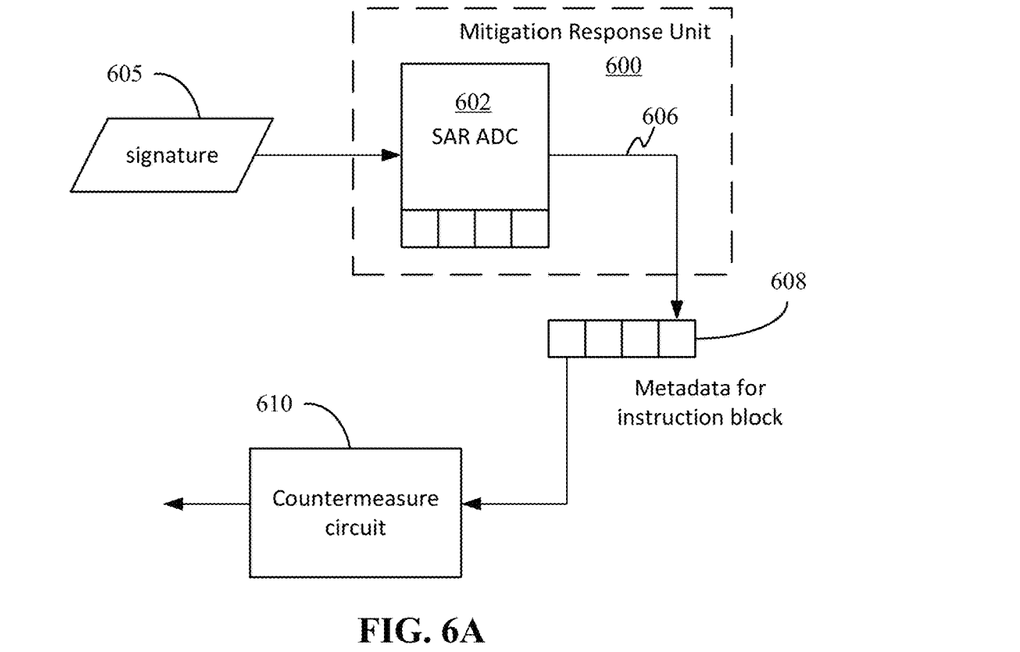
FIGS. 6A and 6B illustrate block diagram representations of mitigation response unit with tuning.
Figure 6B:
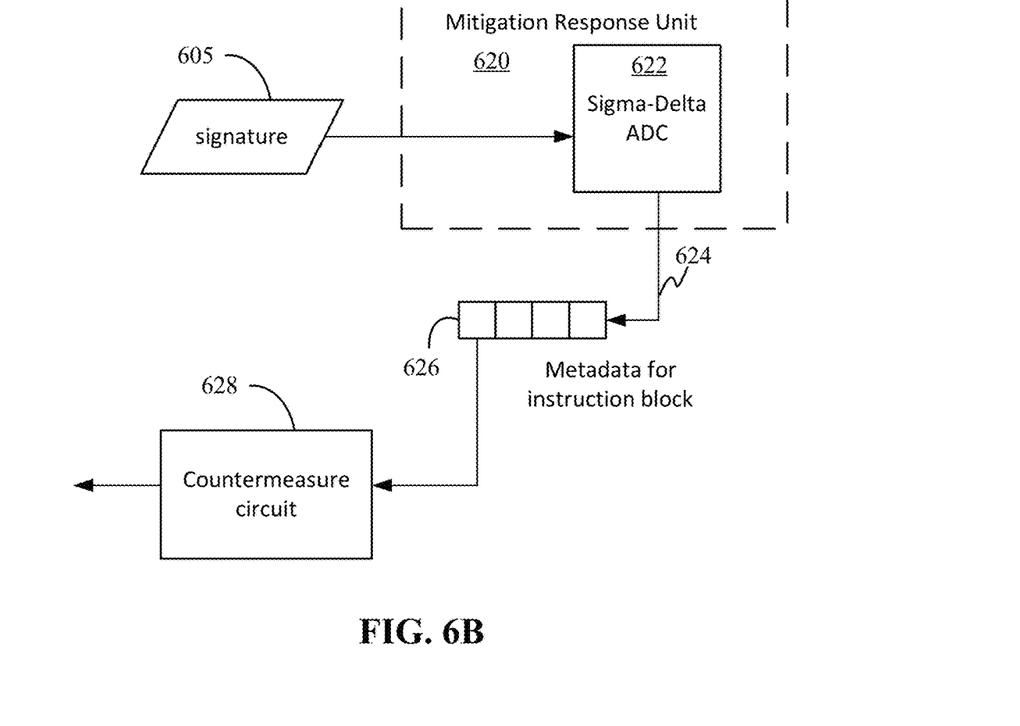

In some cases, processing circuitry 420 can include a successive approximation register (SAR) analog-to-digital converter (ADC) and/or a sigma-delta ADC such as described with respect to FIGS. 6A and 6B. In some cases, processing circuitry 420 can include a pipeline ADC, which is formed of a cascade of stages, where each stage contains a low resolution ADC, digital-to-analog converter (DAC), and amplifier, that successively convert the analog input into its digital representation such that the data is processed in a pipe-lined manner. The pipeline ADC would be able to receive a signature captured during execution of an instruction block and write an observed value to the metadata corresponding to the executed instruction block. In some cases, processing circuitry 420 can include a Flash ADC, for example, formed of a plurality of comparators and a priority encoder. Of course, the processing circuitry 420 may incorporate other topologies.

The model 410 of the mitigation response unit 400 uses the instruction predictions made by the instruction predictor 112 (and, particularly, the corresponding metadata bits 430) and the signature data 434 to tune the mitigation responses provided by the mitigation response unit 400 as control signal(s) 436 to a countermeasure circuit 440.

In some cases, the model 410 can provide responses to individual instruction, e.g. pseudo randomly insert a no-operation (NOP) after each multiply-accumulate (MAC) instruction. Alternatively, the model 410 can rely on branches to delineate the boundaries between instruction sequences and provide responses to the instructions between branches (the "basic block").

Tuning attempts based on basic blocks instead of per instruction, may be less latency sensitive, enabling the use of a larger variety of tuning mechanisms. For instance, the model 410 may associate a branch at address X with a significant dip in supply voltage observed during a previous execution of this branch. The model 410 can respond to this dip in supply voltage by inserting an artificial delay between each instruction of the block, switching a capacitor to temporarily stabilize the power supply, clock stretching, or issuing a set of power intensive "dummy" instructions before or after said block to imitate its signature at a different time as some examples. In some cases, power consumed on a first pass of a basic block or instruction can be measured as a time series, stored and played back, inverted, on a subsequent pass of that basic block or instruction as a form of negative feedback to attempt to eliminate fluctuations in power consumption.

The metadata (e.g., bits 430) used by the mitigation response unit 400 can take several forms. For instance, the metadata may be a single bit, describing whether the corresponding basic block previously caused a significant dip in the supply voltage or a sizeable EM spike as measured by an on-chip antenna. One or more additional bits could then be used to indicate which tuning technique proved effective. An example process carried out by a mitigation response unit is described with respect to FIG. 5B.

Other potential metadata components include software defined annotations, measurements taken during previous execution of a basic block (e.g., the time-series data), and non-saturating counters/shift registers indicating the number of previous occurrences.

For the software defined annotations, the software may mark certain basic blocks as particularly security critical, or others as irrelevant. In some cases, the software (e.g., from a higher level system) can provide information on basic blocks not previously observed at run-time. This may help save power by not trying to protect irrelevant blocks. In some cases, the software-defined annotations can potentially justify more aggressive/less power efficient mitigation techniques for critical blocks without trial and error during their first few occurrences. In some cases, instead of measuring on-chip power consumption and/or EM emissions to determine if a basic block would warrant tuning (see e.g., process 550 described below with respect to FIG. 5B), it is possible to categorize instructions based on their theoretically expected power consumption into separate bands. Combining information from the predictor 112 and fetch unit 114 stage of a processor 110, the model (e.g., model 410) could identify sequences of high powered instructions. These could then, for instance, be spaced out or interleaved with low power instructions according to a control signal 436. Even if measuring circuitry is available, instruction specific information can be used during the first few occurrences of a basic block to inform the default tuning behavior. This may reduce information leaked prior to the first update of the branch predictor state with data from runtime measurements, for example, before the model 410 could decide if a block warranted tuning or not.

Non-saturating counters and shift registers indicating the number of previous occurrences (see e.g., branch predictor 500 of FIG. 5A) may be used by the mitigation response unit 400 in accordance with the model 410 to vary tuning techniques between occurrences or to treat frequently executed blocks differently.

The model 410 of the mitigation response unit may use metadata held with each counter when the prediction is made and/or when the table is updated after a branch was executed.

The metadata obtained when the prediction is made by the instruction predictor 112 can be used to predict which instruction sequence is about to be executed and how the circuit's power/EM signature may be tuned or diffused accordingly. This prediction also provides time to prepare a response performed by a countermeasure circuit, e.g. charge a capacitor or modify speculative state.

In some cases, the model 410 can account for prediction errors in a branch predictor by considering the accuracy/confidence level of the predictor and categorizing available tuning techniques based on their impact in case of a misprediction. By default—or in case of a low confidence prediction—the model 410 may simply trigger a known-to-be-safe (but potentially inefficient) response. Alternatively, the model 410 can examine all potentially upcoming basic blocks (limited to those previously observed) and trigger the tuning technique corresponding to the worst case scenario. The techniques triggered for those predictions can be selected from the pool of those having no observable impact if triggered on a misprediction.

Some countermeasures require careful deployment and are preferred to not occur if there is a misprediction. For those countermeasures, it can be beneficial to instead wait for the branch to be executed. For example, when there is a feature that mirrors an instruction with the opposite pattern (e.g., some implementations of the time-series data playback) or when there is a feature that injects power to compensate for a big draw on the power. These types of countermeasures may, in some cases, only be used once the instruction is known. Of course, some implementations can still perform these countermeasures based on the predictions and even use the mispredictions to inject additional noise into the system by the deployment of a countermeasure when it is not needed.

In some cases, the model 410 uses the metadata after a branch was executed. By obtaining the metadata when the table is updated after a branch was executed, it is known what instructions are about to be executed; hence, any response would no longer be speculative or at risk of misprediction. In addition, the model still benefits from extending existing branch prediction circuitry, as overheads—such as power and area for address specific lookups—can be shared.

As mentioned above, a predictor such as predictor 112/220 with a branch predictor 222 or other similar instruction dependent component can be extended to include additional state-associated metadata. The additional state-associated metadata can include information pertaining to previously observed power/EM emissions (e.g., such as collected by data scavenger 300). This data may then be used by a mitigation response unit (e.g., unit 400) that implements a predictive model (e.g., model 410) to inform subsequent tuning attempts and mitigation techniques.

Figure 5A:
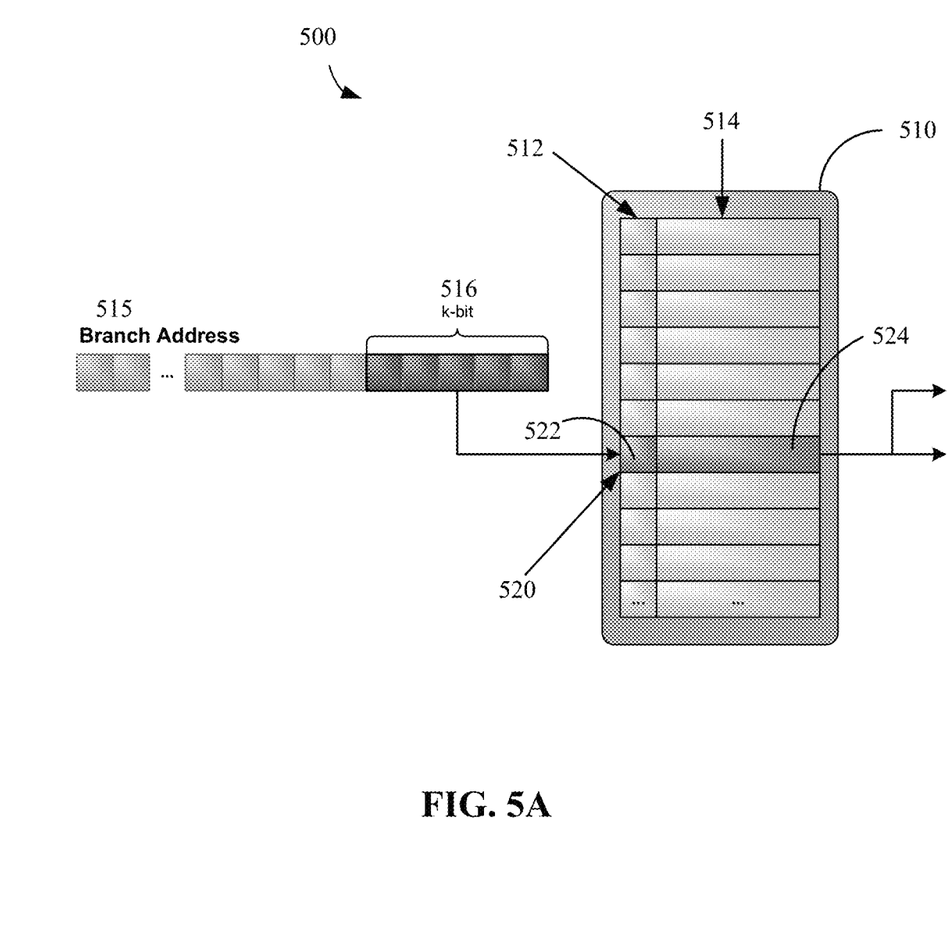
FIG. 5A illustrates a representation of a one-level branch predictor with Power/EM specific Metadata.

FIG. 5A illustrates a representation of a one-level branch predictor with Power/EM specific Metadata. Referring to FIG. 5A, a one-level branch predictor 500 includes a table 510 with metadata information 512 and counter information 514. A branch address 515 is used to index to the table 510. Here, the lower k-bits 516 pertaining to the address of a branch is used to index into an entry 520 of the table 510. Each entry-specific n-bit counter is in-/decremented when the corresponding branch is/is not taken, respectively. A branch is predicted as taken, only if the counter is saturated. Each entry, including entry 520 is annotated with power/EM specific metadata in the metadata information 512. For example, entry 520 includes a certain number of bits of metadata 522 and a corresponding n-bit counter 524. The metadata 522 includes the additional bits to store power/EM specific metadata. In one implementation, the additional bits include a "needs mitigation" bit and one or more countermeasure technique bits. The one or more countermeasure technique bits can represent the particular countermeasure technique to trigger and optionally whether the particular countermeasure technique was successful. For example, the one or more countermeasure technique bits may be specifically assigned bits in the metadata.

Figure 5B:
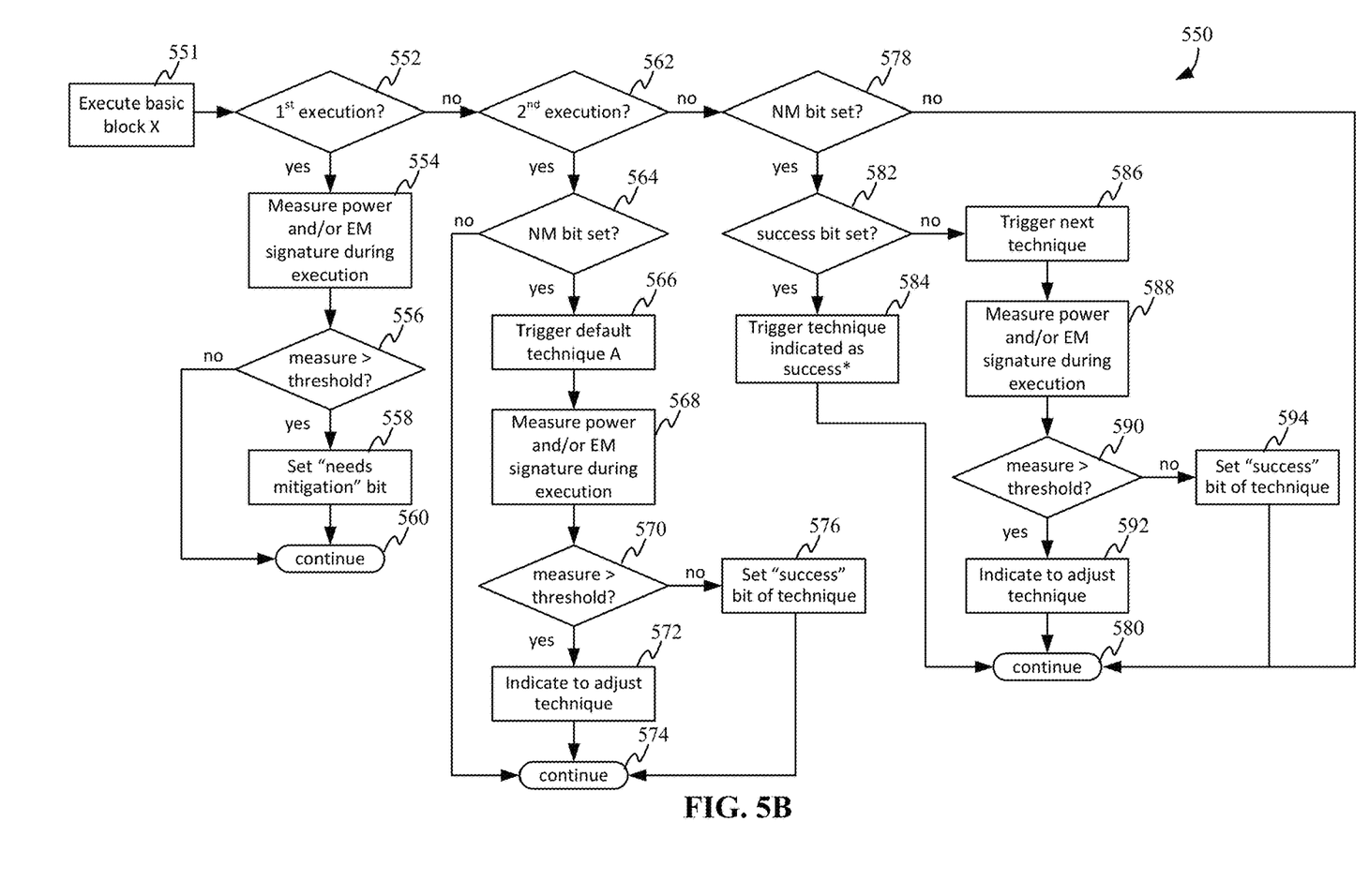
FIG. 5B illustrates an operation of a mitigation response unit.

FIG. 5B illustrates an operation of a mitigation response unit. Referring to FIG. 5B, when a basic block is executed, the mitigation response unit can update the metadata for that block in a manner such as shown in process 550. The actions carried out by the mitigation response unit can depend on the number of times the basic block has been executed (551). For the first execution (552) of the basic block X, the power and/or EM signature received, for example, from a data scavenger, can be measured (554) and a determination (556) made as to whether the measurement exceeds a threshold. The determination may be a comparison of the EM signature or the power signature to the threshold. If the measurement exceeds the threshold, the mitigation response unit can set a "needs mitigation bit" (558), for example within the metadata information (e.g., metadata 522 of entry 520 of FIG. 5A) indexed by an address associated with block X; and processes can continue (560). If it is determined from step 556 that the measurement does not exceed the threshold, the processes can continue (560). In some cases, if the measurement does not exceed the threshold, no bits are written to the metadata. In some cases, something is still written to the metadata. In some cases, the power consumed during the first execution can be recorded as time-series data (e.g., by a SAR ADC, Sigma-Delta ADC, Flash ADC, or Pipeline ADC). This time-series data could then be used in a subsequent execution of the block as the applied countermeasure (and in some cases updated each time the block is executed to converge on a suitable value and/or account for changes in the power signature over time), for example, as described with respect to FIGS. 6A and 6B.

For the second execution (562) of the basic block X, the mitigation response unit can determine (564) whether the needs mitigation (NM) bit is set. If the NM bit is set, then the mitigation response unit can trigger (566) a countermeasure, for example a default technique "A". During execution of the basic block and while the technique A is being executed, the power and/or EM signature received, for example, from a data scavenger, can be measured (568) and a determination (570) made as to whether the measurement exceeds a threshold. If the measurement exceeds the threshold, the mitigation response unit can indicate (572) to adjust the technique and the processes can continue (574). The indication (572) to adjust the technique (e.g., from technique A to another technique) may be to set a bit in the metadata corresponding to a next technique (e.g., by incrementing a value of a set of bits or by shifting to a next bit). If it is determined from step 570 that the measurement does not exceed the threshold, the mitigation response unit may set a success bit (576) indicating "success" of the technique; and processes continue (574). If during the second execution (562) of the basic block X, it is determined in step 564 that the NM bit is not set, then processes can simply continue (574), for example, without triggering a mitigation technique. For branch predictors using n-bit counters to predict if an upcoming branch will be taken or not, said counters may be used by the above mechanism to distinguish the first, second and later execution of a basic block.

For any subsequent execution of basic block X (e.g., that it is not the first execution or the second execution), the mitigation response unit can determine (578) whether the NM bit is set. As with the second execution of basic block X, if it is determined that the NM bit is not set, then processes can simply continue (580), for example, without triggering a mitigation technique. If the NM bit is set, the mitigation response unit can determine (582) whether a success bit is set. If the success bit is set, then the mitigation response unit can trigger (584) the tuning technique indicated as success. In addition to or as an alternative to the tuning technique indicated as successful from a prior execution, the particular technique may change over time. For example, the particular technique may change due to measurements shifting or thresholds changing for various circumstances or on purpose. In some cases, the technique may deliberately change as part of a programmatic adjustment to which one of a set of countermeasures to use during subsequent executions (helping to obfuscate or inject noise into the system and avoid predictable repetition).

If it is determined during step 582 that the success bit is not set, the mitigation response unit can trigger (586) the next technique (e.g., as identified by the indication to adjust technique or some other indication). During execution of the basic block and while the next technique is being executed, the power and/or EM signature received, for example, from a data scavenger, can be measured (588) and a determination (590) made as to whether the measurement exceeds a threshold. If the measurement exceeds the threshold, the mitigation response unit can indicate (592) to adjust the technique and processes can continue (580). If it is determined from step 590 that the measurement does not exceed the threshold, the mitigation response unit may set a success bit (594) indicating "success" of the technique; and processes continue (580).

The process illustrated in FIG. 5B can save power by not triggering the model for basic blocks known (via the metadata) to be inconspicuous (in terms of their power/EM signature). In addition, the process provides feedback on the success of previous tuning attempts to the model, allowing the selection of techniques that are known to be effective. In case of multiple effective techniques, the model may save power by selecting the most efficient, or deliberately alternate between them to introduce additional noise. Moreover, in case of a machine-learning based model, the metadata may be used to trigger and/or guide re-training (e.g., if the model underperforms during operation). Finally, success metrics may be collected and potentially upstreamed (e.g., to a higher level system) to inform the development of further mitigation techniques.

Figure 7A:
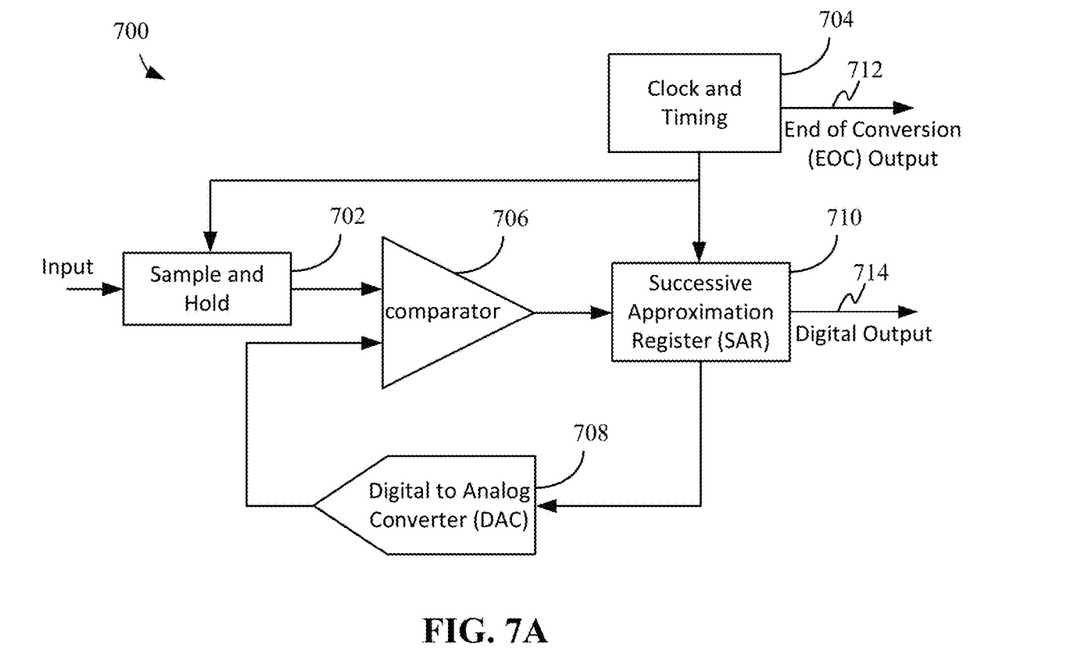
FIG. 7A illustrates a standard SAR ADC configuration.

FIGS. 6A and 6B illustrate block diagram representations of a mitigation response unit with tuning. Referring to FIG. 6A, a mitigation unit 600 can include a SAR ADC 602 that receives a signature 605 captured during execution of an instruction block (e.g., block X of FIG. 5B) and writes an observed value 606 to the metadata 608 corresponding to the executed instruction block. An example of a SAR ADC is shown in FIG. 7A. The countermeasure circuit 610 can use the observed value 606 to produce a response. For example, the countermeasure circuit 610 may inject power to compensate for a draw on the power using the observed value 606 representing the power draw.

Referring to FIG. 6B, a mitigation unit 620 can include a sigma-delta ADC 622 that receives a signature 605 captured during execution of an instruction block and writes an observed value 624 to the metadata 626 corresponding to the executed instruction block. The value can be refined over time and used by the countermeasure circuit 628 to produce a response similar to countermeasure circuit 628 of FIG. 6A.

FIG. 7A illustrates a standard SAR ADC configuration. Referring to FIG. 7A, an SAR ADC 700 includes a sample and hold circuit 702 receiving the input and outputting a sampled voltage value according to a clock and timing control circuit 704. The sampled voltage value is input to a comparator 706. The comparator 706 compares the sampled voltage value from the sample and hold circuit 702 to an output of a digital and analog converter (DAC) 708 and outputs the result to a Successive Approximation Register (SAR) 710. The comparator 706 functions to determine the state of the current bit. For each bit and under the control of the clock and timing control circuit 704, the SAR 710 outputs a binary code to the DAC 708 that is dependent on the current bit under scrutiny and the previous bits already approximated. The DAC 708 provides the comparator 706 with an analog voltage equal to the binary code output from the SAR 710. Once all bits have been approximated, the digital approximation is output as digital output 712 at the end of the conversion (EOC). The clock and timing control circuit 704 can output an EOC signal 714 indicating the EOC. When incorporated in a mitigation unit, such as mitigation unit 600, the digital output 712 represents the observed value 606.

Figure 7B:
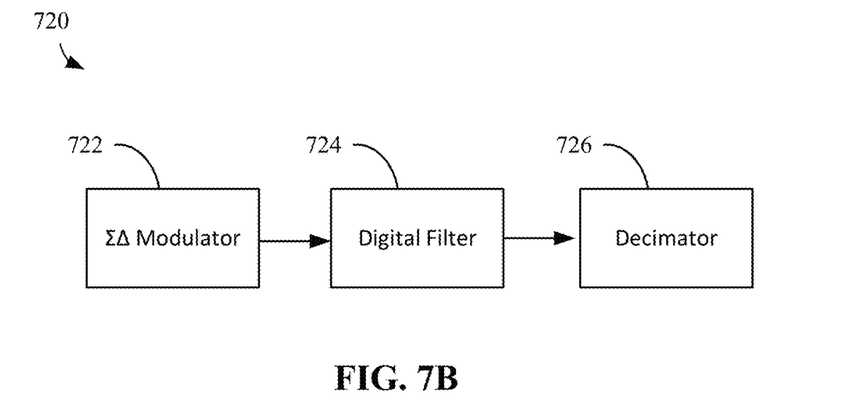
FIG. 7B illustrates a standard sigma delta ADC configuration.

FIG. 7B illustrates a standard sigma delta ADC configuration. Referring to FIG. 7B, a sigma delta ADC 720 can include a sigma delta modulator 722, digital filter 724, and decimator 726. A sigma delta modulator 722 generally includes an integrator, comparator, and 1-bit DAC in order to convert an input signal to a high-speed, single bit, modulated pulse wave. The sigma delta modulator 722 oversamples the input and each individual sample is accumulated over time and "averaged" with the other input-signal samples through the digital filter 724 and decimator 726. When used in a mitigation unit such as mitigation unit 620, a bit stream is accumulated and then decimated down to a binary value that can then be fed into the countermeasure circuit such as countermeasure circuit 630.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A processing system comprising:
a memory;
a processor comprising an instruction predictor, wherein the instruction predictor comprises a storage device for storing metadata associated with corresponding instruction blocks; and
a mitigation response unit coupled to the instruction predictor to write and read the metadata associated with the corresponding instruction blocks, wherein the mitigation response unit comprises a storage and processing circuitry, wherein the mitigation response unit is configured to determine a mitigation technique for an instruction block based on an electromagnetic or power signature corresponding to execution of the instruction block and metadata associated with the instruction block, wherein the mitigation response unit determines the mitigation technique in accordance with a model stored in the storage.

2. The processing system of claim 1, wherein the instruction predictor comprises a look ahead buffer.

3. The processing system of claim 1, wherein the instruction predictor comprises a branch predictor, wherein the storage device comprises at least one set of mitigation metadata bits, the mitigation response unit coupled to write to and read from the at least one set of mitigation metadata bits.

4. The processing system of claim 1, wherein each of the corresponding instruction blocks is a basic block.

5. The processing system of claim 1, wherein the processing circuitry comprises a successive approximation register (SAR) analog to digital converter (ADC).

6. The processing system of claim 1, wherein the processing circuitry comprises a sigma-delta ADC.

7. The processing system of claim 1, wherein the mitigation response unit compares the electromagnetic or power signature generated during the execution of the instruction block to a threshold; and writes at least one bit to the metadata associated with the instruction block to indicate a result of the comparison.

8. The processing system of claim 7, wherein the result of the comparison includes a determination that the signature exceeds the threshold or a determination that a mitigation technique is a success.

9. The processing system of claim 1, wherein the metadata stores a representation of the electromagnetic or power signature generated during the execution of the instruction block.

10. The processing system of claim 1, wherein the metadata stores an indication of a mitigation technique to be used when the instruction block is executed.

11. A method for mitigation of information leakage, comprising:

predicting a next instruction block;
reading at least one bit from metadata associated with the next instruction block;
applying a mitigation technique according to the at least one bit read from the metadata;
receiving a signature measurement obtained during execution of the next instruction block;
determining whether the signature measurement exceeds a threshold value for the signature measurement; and
writing at least one bit to the metadata associated with the next instruction block according to a result of the determining whether the signature measurement exceeds the threshold value for the signature measurement.

12. The method of claim 11, wherein writing the at least one bit comprises writing a bit indicating whether or not signature measurement exceeds the threshold.

13. The method of claim 11, wherein writing the at least one bit further comprises writing a success bit for a mitigation technique.

14. The method of claim 11, wherein writing the at least one bit comprises writing a representation of the signature measurement.

15. The method of claim 14, wherein applying the mitigation technique comprises using the representation of the signature measurement to mitigate a subsequent execution of the next instruction block.

16. The method of claim 11, wherein the next instruction block is a basic block.

17. The method of claim 11, wherein predicting the next instruction block comprises using a branch predictor to predict the next instruction block.

18. The method of claim 11, further comprising preparing a countermeasure circuit for applying the mitigation technique at a time of the predicting of the next instruction block, wherein the applying of the mitigation technique is performed at a time the next instruction block is executed.

19. The method of claim 11, wherein predicting the next instruction block comprises reading a look ahead buffer.

20. A processing system comprising:

a memory;
a processor comprising an instruction predictor, wherein the instruction predictor comprises a branch predictor and a storage device for storing metadata associated with corresponding instruction blocks, wherein the storage device comprises at least one set of mitigation metadata bits; and
a mitigation response unit coupled to the instruction predictor to write and read the metadata associated with the corresponding instruction blocks, wherein the mitigation response unit is coupled to write to and read from the at least one set of mitigation metadata bits, wherein the mitigation response unit is configured to determine a mitigation technique for an instruction block based on an electromagnetic or power signature corresponding to execution of the instruction block and metadata associated with the instruction block.

* * * * *